C. L. CRUVER.
HAT MIRROR.
APPLICATION FILED AUG. 13, 1909.

943,005.

Patented Dec. 14, 1909.

Witnesses:
J. C. Devick.
C. Paul Parker.

Inventor:
Curtis L. Cruver
By Luther L. Miller,
Attorney.

UNITED STATES PATENT OFFICE.

CURTIS L. CRUVER, OF CHICAGO, ILLINOIS.

HAT-MIRROR.

943,005.  Specification of Letters Patent.  Patented Dec. 14, 1909.

Application filed August 13, 1909. Serial No. 512,690.

*To all whom it may concern:*

Be it known that I, CURTIS L. CRUVER, a citizen of the United States, residing at Chicago, in the county of Cook and State of Illinois, have invented certain new and useful Improvements in Hat-Mirrors, of which the following is a specification.

The object of this invention is to provide an improved means for securing a mirror in place in a hat.

Figure 1:
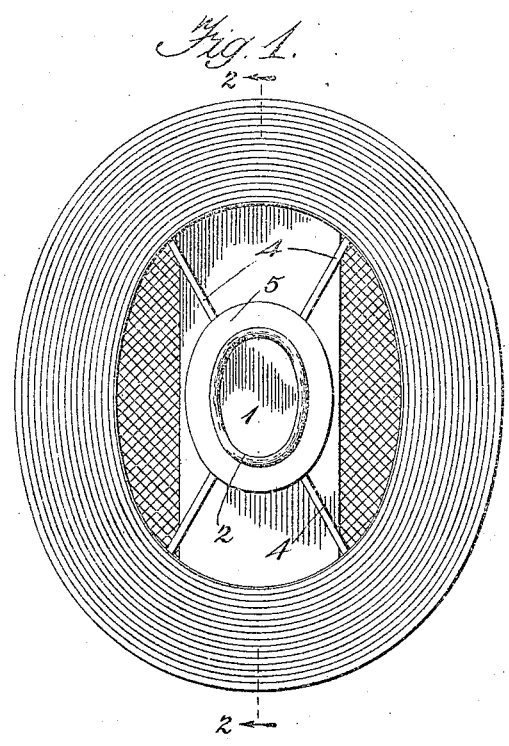
Figure 2:
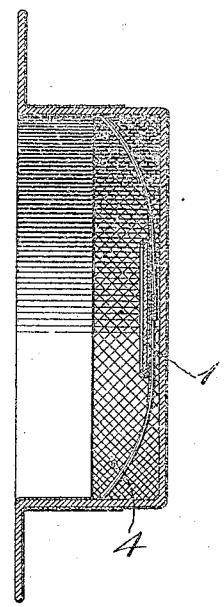
Figure 3:
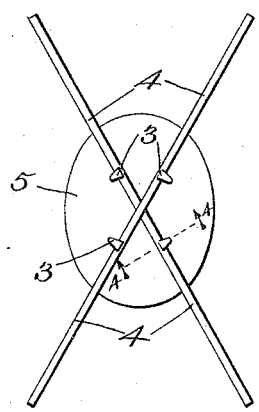
Figure 4:
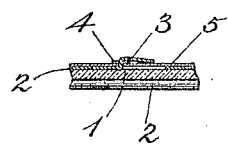

In the accompanying drawings Figure 1 is an underside view of a hat, showing in operative relation to the hat a mirror embodying my invention. Fig. 2 is a section on line 2 2 of Fig. 1. Fig. 3 is a rear side elevation of the mirror and its retaining means. Fig. 4 is an enlarged sectional view on line 4 4 of Fig. 3.

The mirror 1 and its casing 2 may be of any common or preferred form, the casing however preferably being of metal and having a plurality of ears 3 thereon at the back of the mirror, said ears being formed, in this instance, by punching them from the metal. The ears 3 constitute the means for securing to the mirror a pair of resilient metallic strips 4, the ears extending through openings in said strips and being bent to hold the strips in place. The strips 4 in this instance cross each other, and are of a length somewhat greater than the diameter of the hat so that when the mirror is pushed into the crown of the hat, the ends of the strips are flexed outwardly, said ends engaging the sides of the crown and holding the mirror in place.

If desired, a sheet 5 of paper or other suitable material may be placed between the mirror back and the straps 4, the ears 3 passing through said sheet and holding it in place. The sheet 5 extends beyond the edge of the mirror and provides space for displaying advertising matter, the construction herein shown being particularly well adapted for this purpose.

I claim as my invention:

1. A hat mirror comprising a mirror proper, a casing therefor, ears upon the rear side of said casing and integral therewith, resilient strips, the ends of which are adapted to engage the inner walls of a hat crown, said ears being bent to overlie said strips and secure said strips to said casing.

2. A mirror-retaining means for hats comprising a mirror casing having two pairs of ears upon its rear side, and two resilient strips, the ends of which are adapted to engage the inner vertical walls of a hat crown, said strips crossing each other and having openings therein, said ears extending through said openings and being bent to secure said strips to said mirror casing.

CURTIS L. CRUVER.

Witnesses:
LUTHER L. MILLER,
GEORGE L. CHINDAHL.